UNITED STATES PATENT OFFICE.

VICTOR LÖWENDAHL, OF STOCKHOLM, SWEDEN.

MANUFACTURE OF STEREOTYPE-PLATES.

SPECIFICATION forming part of Letters Patent No. 548,320, dated October 22, 1895.

Application filed October 11, 1894. Serial No. 525,631. (Specimens.)

*To all whom it may concern:*

Be it known that I, VICTOR LÖWENDAHL, a subject of the King of Sweden and Norway, residing at Stockholm, in the Kingdom of Sweden, have invented certain new and useful Improvements in the Manufacture of Stereotype-Plates; and I do hereby declare the following to be a full, clear, and exact description of the invention, such as will enable others skilled in the art to which it appertains to make and use the same.

My invention has relation to the art of obtaining stereotype-plates for printing purposes; and it has for its object the provision of very simple means whereby the desired results are attained.

The mode of obtaining stereotype-plates for printing purposes according to my invention consists, broadly, in bringing the salient portions of an original—such as a form of type, or an engraved block or plate, or a sheet of drawing—into contact with a suitable substance in a more or less fluid state, so that said substance will adhere only to the face of the salient portions of the original, and then causing the latter to recede from the substance and draw the same along at the points of adherence, leaving said substance behind at all intermediate points, whereby salient portions corresponding with those of the original will be reproduced in the stereotype-plate, the original being maintained in the last-described position until the entire mass of the substance has again congealed or set or become hard, after which the stereotype-plate so produced is separated from the original and is ready for printing purposes, or may then be completed for printing purposes.

The above-described mode of operation is available in all cases where the depressions are of sufficient depth to prevent contact between the more or less fluid substance and the faces of the depressed portions and the encompassing walls thereof. When, however, the depressions are so shallow that contact between their faces and encompassing walls cannot be prevented without extraordinary care and skill of manipulation, or where it is physically impossible to prevent such contact—as, for instance, in the production of a stereotype-plate from a sheet of drawing—I prepare the latter in a suitable manner to prevent adhesion of the substance to the depressed portions, as hereinafter described.

In carrying out my invention I employ for the production of stereotype-plates any substance suitable for printing purposes and adapted to be brought to a suitable state of fluidity—as, for instance, a metal or an alloy of metals, as type-metal—and if the reproduced plate is to be used for obtaining an electrotype any suitable substance adapted to be brought to a suitable state of fluidity can be employed—as wax, for instance.

I will first describe my invention in its application to the production of stereotype-plates for printing purposes where the depressions in the original are of sufficient depth to obviate the necessity of a special preliminary preparation hereinbefore referred to.

The type-metal having been brought to a suitable state of fluidity, the original, (form or plate or block,) previously cleansed, so that the metal will adhere to the face of the salient portions thereof, is brought into contact with the surface of the metal, either by hand or in any other suitable manner. The metal will more or less congeal by contact with and adhere to the colder surfaces of the salient parts of the original, after which the latter is moved away from the metal, which is thereby drawn along at the portions adhering to the said original, while the metal facing the depressions is left behind, thereby forming salients on the surface of the metal corresponding with those on the original. The metal is now allowed to cool and finally separated from the original.

It is obvious that if a thin layer of metal is used the stereotype-plate obtained may then be backed or otherwise completed for printing purposes.

Instead of moving the original to and from the metal, the latter may be moved to and from the original, as will be readily understood.

In the production of stereotype-plates from originals in which the depressions are so shallow as to render it difficult to prevent contact therewith of the more or less fluid substance, as a metal or alloy, I prepare the original in such manner that the metal will not adhere to the depressed portions of such original. This may conveniently be done as follows, assuming a stereotype-plate to be produced from a pencil drawing, for example: The drawing is made upon any suitable material capable of resisting the action of an electrolyte as well as that of the hot metal with which it is to be brought into contact. Any metal, for instance, adapted to receive a pencil-drawing and capable of resisting the action of the electrolyte and that of the molten metal may be used. I have found that plate or sheet aluminium answers the purposes best, and this is first prepared by grinding with an abrading substance, as emery, so as to produce on the sheet a fine-grained surface that will readily receive a pencil-drawing. The surface is next treated with hydrate of soda, and then with nitric acid, by which treatment the surface becomes almost as white as ordinary writing-paper and at the same time changes the affinity of the surface for other metals, so that such other metal can not be deposited upon such surface by the process of electroplating, or, at least, rendering the deposition of metal by said process upon the prepared surface extremely difficult.

Upon the surface of the aluminium plate or sheet prepared as described is made the pencil-drawing, in making which the non-conductive coating formed on the plate, as above described, is removed by the pencil, the graphite of the latter being substituted for the removed non-conductive substance, and as the graphite is a conductor of electricity a metal—as copper, for instance—can readily be deposited thereon electrically, this being done in a well-known manner, thereby raising the salient portions of the original—namely, the pencil-marks—sufficiently to admit of the production of a stereotype-plate in the manner above described, the metallized salients being of course well cleaned, so that the type-metal will readily adhere thereto. Those portions of the original not covered with graphite will remain bare during the process of electroplating, while the more or less fluid metal used for the stereotype-plate will not adhere thereto. When the aluminium plate or sheet is separated from the stereotype after congelation and cooling of the latter, the salients thereon will be copper-plated the same as in the original; but when ordinary type or other metal is used the union between the copper deposited on the original and the said metal may not be sufficiently intimate to produce a stereotype-plate suitable for printing purposes that would stand the necessary wear. To avoid this I preferably employ a solder—as an alloy of tin, lead, and bismuth—that will melt at a comparatively low temperature and will intimately combine with the previously-cleaned copper deposit on the original.

When the drawing is of such a nature as to leave large blank surfaces, atmospheric pressure upon the more or less fluid alloy will prevent the formation of the corresponding depressions when the original is caused to recede from the alloy. This difficulty I overcome, preferably, by operating in a partial vacuum, or by coating the blank spaces with a substance to which the metal will not adhere, as paraffine, or with a vaporizable fluid, as a volatile oil or water, that will vaporize by contact with the hot alloy and form between it and the original a gaseous cushion that will admit of the depressions being formed when said original is caused to recede from the alloy, or vice versa, or a substance or metal vaporizable at a temperature equal to or below the melting-point of the alloy employed, as mercury, may be mixed with the alloy, so as to form gases that will lodge into the chambers formed by the original, the encompassing metallized salients thereon and the alloy thus also favoring the production of the depressions in the stereotype-plate.

It is apparent that in the mode of operation described in reference to stereotype-plates produced from pencil-drawings the all-important point is to form salients on the plate corresponding exactly with those on the original, which latter may be produced in many other ways known in the arts to which this invention relates.

It is further apparent that any other suitable conductor of electricity may be employed in the production of the design in lieu of graphite.

Having thus described my invention, what I claim as new therein, and desire to secure by Letters Patent, is—

1. The mode of reproducing forms such as described, which consists in causing a suitable material in a more or less fluid state to adhere to the face of the salients of the form to be reproduced, and causing the two to recede from each other to draw out the more or less fluid material, whereby salients are formed on the surface of said material corresponding with the salients on the surface to be reproduced, allowing said material to congeal, set, or harden, and then separating the same from the form.

2. The mode of reproducing forms such as described, which consists in forming a design upon a conductive surface covered with a bad or non-conductor of electricity to which a more or less fluid congealable substance will not readily adhere, removing the non-conductor of electricity from those parts of the conductive surface that constitute the design, and substituting a conductive substance therefor, electro-plating the design, bringing the same into contact with a molten metal that will readily adhere to the electro-plating, causing the one to recede from the other sufficiently to draw out the molten metal and form salients on the surface corresponding with the electroplated design, allowing said metal to congeal, and separating the latter from the design bearing surface, for the purpose set forth.

3. The mode of reproducing forms such as described which consists in covering or coating a conductive surface with a bad or non-conductor of electricity, to which a molten metal or alloy will not readily adhere, forming a design upon such surface by means of a conductor of electricity, as a graphite pencil in such manner as to remove the non-conductive coating and substitute the graphite therefor, electro-plating the design, bringing the same into contact with a molten metal or alloy that will readily adhere to the electro-plating, causing the one to recede from the other sufficiently to draw out the metal and form surface salients corresponding with the electro-plated design, allowing such metal to congeal, and separating the same from the design bearing surface, for the purpose set forth.

4. The mode of reproducing forms such as described, which consists in treating an aluminium surface first with hydrate of soda, then with nitric acid, forming a design on the said surface by means of a conductor of electricity in such manner as to remove the non-conductive coating formed by the aforesaid treatment and substitute therefor the said conductor of electricity, electroplating the design, bringing the same into contact with a molten metal or alloy that will readily adhere to the electro-plating, causing the design bearing surface to recede from such molten metal sufficiently to draw out the same and form surface salients corresponding with the electro-plated design, allowing the metal to congeal and separating the same from the aluminium surface, for the purpose set forth.

5. The mode of reproducing forms such as described, which consists in forming a grain upon and then treating an aluminium surface first with hydrate of soda, then with nitric acid, forming a design upon such surface by means of a conductor of electricity, as graphite, in such manner as to remove the non-conductive coating formed by the aforesaid treatment and replace it by graphite, electro-plating the graphite design, bringing the same into contact with a molten metal or alloy that will readily adhere to the electro-plating, causing the one to recede from the other sufficiently to draw out the molten metal and form surface salients corresponding with the electro-plated design, allowing the metal to congeal, and separating the same from the aluminium surface, for the purpose set forth.

6. In the art of reproducing forms such as described, the improvement which consists in treating an aluminium surface first with hydrate of soda and then with nitric acid, whereby a non-conductive metal repelling coating is formed on said surface, for the purpose set forth.

7. In the art of reproducing forms such as described, the improvement which consists in treating an aluminium surface first with hydrate of soda, then with nitric acid, and forming upon said treated surface the design to be reproduced by means of a conductor of electricity in such manner as to remove the non-conductive coating formed by the aforesaid treatment and substitute therefor the conductor of electricity substantially as and for the purpose set forth.

8. In the art of reproducing forms such as described, the improvement which consists in treating an aluminium surface first with hydrate of soda, then with nitric acid, forming the design to be reproduced on said surface by means of a conductor of electricity in such manner as to remove the non-conductive coating formed by the aforesaid treatment and substitute therefor the conductor of electricity, and electro-plating the design, substantially as and for the purpose set forth.

9. In the art of reproducing forms such as described, the improvement which consists in first forming a grain upon a polished aluminium surface, and next a non-conductive metal-repelling coating, by treating the grained surface with hydrate of soda and nitric acid, forming the design to be reproduced upon said treated surface by means of a conductor of electricity as graphite in such manner as to remove the coating and substitute the graphite therefor, and electro-plating the graphite design, substantially as and for the purpose set forth.

In testimony that I claim the forgoing as my invention I have signed my name in presence of two subscribing witnesses.

VICTOR LÖWENDAHL.

Witnesses:
E. C. GYESTVAUZ,
HUGO HOFFMAN.